United States Patent
Nakajima et al.

[11] Patent Number: 6,054,938
[45] Date of Patent: Apr. 25, 2000

[54] OPTICAL ENCODER

[75] Inventors: Hajime Nakajima; Masahiro Shikai; Toru Oka; Toshiro Nakashima; Kazuo Takashima, all of Tokyo, Japan

[73] Assignee: Mitsubishi Denki Kabushiki Kaisha, Tokyo, Japan

[21] Appl. No.: 09/021,271

[22] Filed: Feb. 10, 1998

[30] Foreign Application Priority Data

Jul. 17, 1997 [JP] Japan ................................. 9-192644

[51] Int. Cl.⁷ .............................. H03M 1/00; G01D 5/34
[52] U.S. Cl. ........................................ 341/13; 250/231.13
[58] Field of Search .................. 341/13, 14; 250/231.13, 250/231.14, 231.15, 231.16, 231.17, 231.18

[56] References Cited

U.S. PATENT DOCUMENTS

| | | | |
|---|---|---|---|
| 4,958,072 | 9/1990 | Hofler et al. ....................... | 250/231.13 |
| 5,288,995 | 2/1994 | Strachan ............................. | 250/227.12 |

FOREIGN PATENT DOCUMENTS

| | | | |
|---|---|---|---|
| 4-42604 | 7/1992 | Japan ............................... | G01D 5/36 |
| 4-49539 | 11/1992 | Japan ............................... | G01D 5/36 |

*Primary Examiner*—Howard L. Williams
*Attorney, Agent, or Firm*—Sughrue, Mion, Zinn, Macpeak & Seas, PLLC

[57] ABSTRACT

A detecting unit provided with an optical system is disposed away from a control unit formed by an electric circuit and an optical transmission/receiving means, and the detecting unit and the control unit are coupled through a transmission optical fiber. The control unit transmits to the detecting unit through the optical fiber a light wave which was subjected to the intensity modulation by a sinusoidal wave of a predetermined frequency. The transmitted light wave is branched into at least two branched optical paths within the detecting unit thereby to perform the phase modulation as to the respective light waves. The light waves passed through the respective branched optical paths are subjected to the phase modulation by the sinusoidal waves which differ in phase ¼ period by ¼ period from one another according to a position on a straight line or a rotation angle of a subject to be detected. Then, the light waves thus subjected to the intensity modulation are coupled to a single transmission optical fiber through the branched optical paths and transmitted to the control unit through the transmission optical fiber. In the control unit, the modulated light wave is received and subjected to the phase detection, thereby to calculate and output the position and the rotation angle in accordance with the phase modulation amount of the received light wave.

7 Claims, 8 Drawing Sheets

OPTICAL ENCODER

BACKGROUND OF THE INVENTION

The present invention relates to an optical encoder for detecting a position of an object to be detected moving along a straight line or a rotation angle of a rotating member.

Figure 8:
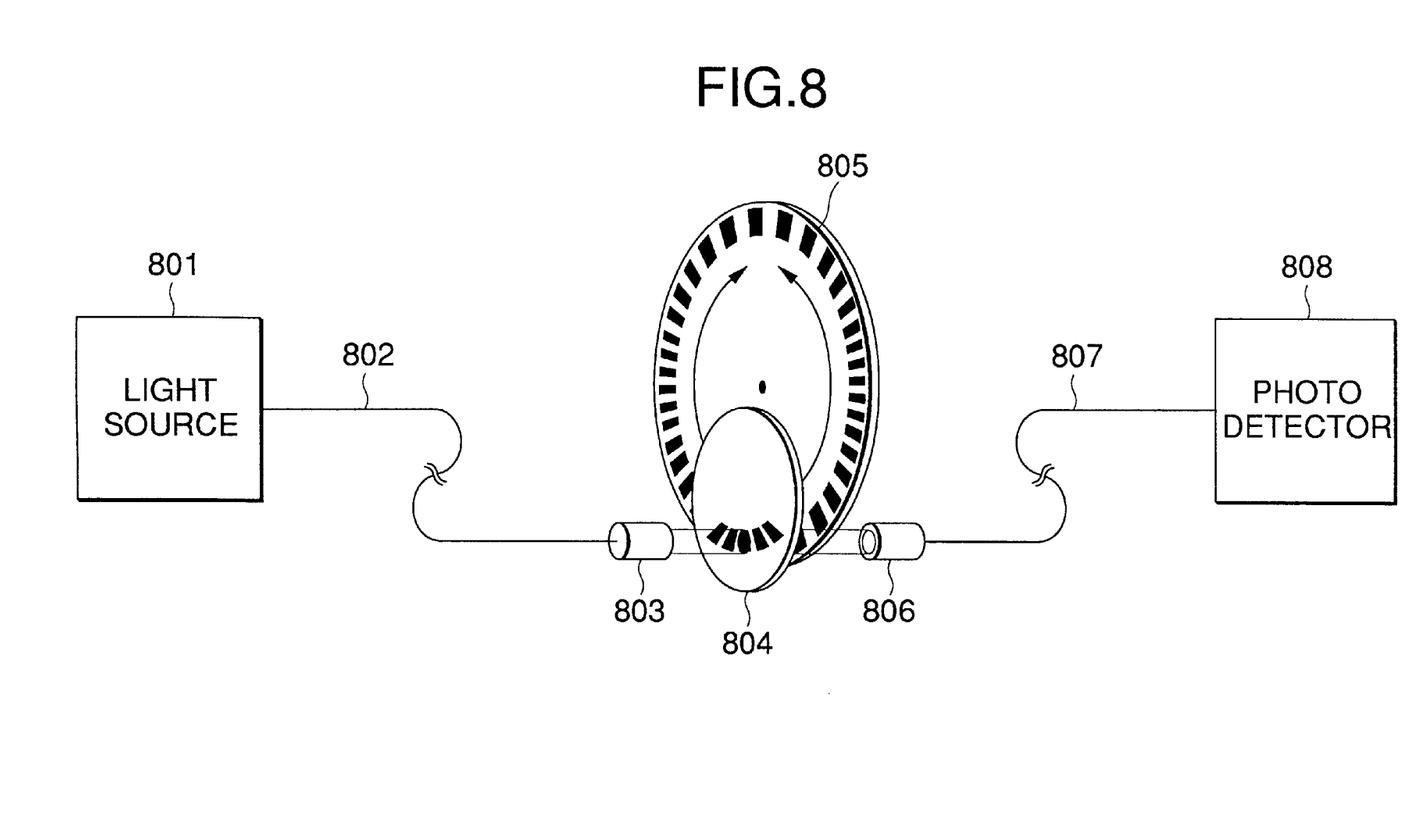
FIG. 8 is a diagram showing an arrangement of a conventional optical fiber type encoder.

FIG. 8 is a diagram showing an arrangement of a conventional optical fiber type encoder. In this figure, a reference numeral 801 depicts a light source, 802 and 807 respectively depict a transmission side optical fiber and a receiving side optical fiber, 803 and 806 respectively depict a transmission side collimator lens and a receiving side collimator lens, 804 a stationary slit plate, and 805 a rotating slit plate attached to a rotary shaft which is a subject to be detected. Further, a reference numeral 808 depicts a photo detector.

Then, the explanation will be made as to the operation of such a conventional optical fiber type encoder. A light beam irradiated from the light source 801 passes through the transmission side optical fiber 802 and converted in parallel spatial light by the transmission side collimator lens 803. The spatial light irradiated from the collimator lens is illuminated on a slit formed on the stationary slit plate 804. The slits of the rotating slit plate 805 are arranged with such a pitch that the slits divide the outer periphery of the rotating slit plate with an equal interval so as to intermittently transmit the light therethrough. The stationary slit plate 804 is also provided with slits having the same configuration as those of the rotating slit plate 805 only at the light-illuminated area thereof. According to such an arrangement, the light transmitted through the stationary slit plate 804 is provided with light intensity distribution according to the configuration of the slit thereof and then illuminated on the rotating slit plate 805. The rotating slit plate 805 is also provided with the slits of the same configuration as that of the stationary slit plate. When the rotating slit plate is rotating, a light quantity of the light passed through the rotating slit plate 805 becomes maximum when the slit of the rotating slit plate is located at the rotation position coinciding with the bright portion of the light passed through the stationary slit plate 804, but becomes minimum when coinciding with the dark portion of the stationary slit plate. The light passed through the rotating slit plate 805 is coupled with the receiving side optical fiber 807 through the receiving side collimator lens 806 and then transmitted to the light detector 808, which in turn converts the light into an electric signal and outputs it. In this manner, since the light transmitted to the photo detector 808 becomes a signal which blinks repeatedly in accordance with the rotation of the rotating slit plate 805, the rotational position of the rotating slit plate 805 can be detected by counting the number of the blinking. However, the rotation direction of the rotating slit plate can not be detected from the single blinking signal. In other words, in order to detect the rotation direction of the rotating slit plate, it is required to provide another optical system which outputs a signal whose phase differs by 90° from the signal output from the photo detector. Further, it is required to provide still another system for correcting the initial position of the rotating slit plate which outputs a pulse at every revolution of the rotating slit plate. Thus, the conventional optical fiber type encoder requires three optical systems in total. The aforesaid encoder is an incremental type encoder which counts the increase or decrease of the blinking of the light. Such an encoder requires, in order to detect the absolute position of the rotation of the rotating slit plate, a plurality of slit tracks arranged to deliver a binary blinking signal in accordance with the rotational position of the rotating slit plate and the same number of optical systems for detecting the blinking of the signal.

Since the conventional optical fiber type encoder is arranged in this manner, there is a problem that the arrangement of the encoder is complicated, the manufacturing thereof is difficult and the cost of the encoder is high since a plurality of optical fibers are required for signal transmission.

SUMMARY OF THE INVENTION

The present invention intends to obviate the aforesaid problem of the prior art and so an object of the present invention is to provide a cheap detecting device which detects absolute positional information by using a single or small number of optical fiber for signal transmission.

An optical encoder according to the first arrangement of the present invention is arranged in a manner that, in an optical encoder for detecting a position on a straight line or a rotation angle of a subject to be detected, the optical encoder comprises a transmission means for transmitting a first intensity modulation light obtained by subjecting the subject to be detected to intensity modulation by using a sinusoidal wave, a branching means for branching the first intensity modulation light into a plurality of branched first intensity modulation lights, a phase modulating means for modulating in phase the plurality of branched first intensity modulation lights in a manner that the plurality of branched first intensity modulation lights are shifted in phase ¼ period by ¼ period from one another, an intensity modulating means for respectively subjecting the plurality of branched first intensity modulation lights to intensity modulation by sinusoidal waves whose phases are shifted ¼ period by ¼ period from one another and which are accorded to a position on a straight line or a rotation angle of the subject to be detected thereby to obtain a plurality of second intensity modulation lights, a coupling means for coupling the plurality of second intensity modulation lights to a single optical transmission path, and a phase detecting means for detecting a phase difference between the combined second intensity modulation lights and the first intensity modulation lights, wherein a position on a straight line or a rotation angle of the subject is obtained from the detected phase difference.

An optical encoder according to the second arrangement of the present invention is arranged in a manner that the phase modulating means is formed by a plurality of optical fibers whose optical lengths are made different from one another in a manner that they are shifted from one another ¼ period by ¼ period as to the first intensity modulation lights.

An optical encoder according to the third arrangement of the present invention is arranged in a manner that the phase modulating means is formed by a plurality of optical fibers whose optical lengths are sequentially shifted from one another by an optical length half as large as the optical length difference, and a reflecting means for reflecting lights passed through the plurality of optical fibers and passing the reflected lights to the same optical fibers again.

An optical encoder according to the fourth arrangement of the present invention is arranged in a manner that the branching means branches the first intensity modulation light into four branched first intensity modulation lights.

An optical encoder according to the fifth arrangement of the present invention is arranged in a manner that the branching means branches the first intensity modulation light into two branched first intensity modulation lights, the optical encoder further comprises a compensating means for canceling the first intensity modulation light component contained in the combined second intensity modulation lights by a compensating signal having an amplitude and a phase same as those of the first intensity modulation light component.

An optical encoder according to the sixth arrangement of the present invention is arranged in a manner that the optical encoder further comprises a local oscillator for oscillating with a frequency different from that of the first intensity modulation light, and frequency converters for subjecting the first intensity modulation light signal and the combined second intensity modulation light signal to frequency conversion by the oscillation signal from the local oscillator, wherein a phase difference between the signals subjected to the frequency conversion by the frequency converters is detected thereby to perform heterodyne reception.

DETAILED DESCRIPTION OF PREFERRED EMBODIMENTS

First Embodiment

Figure 1:
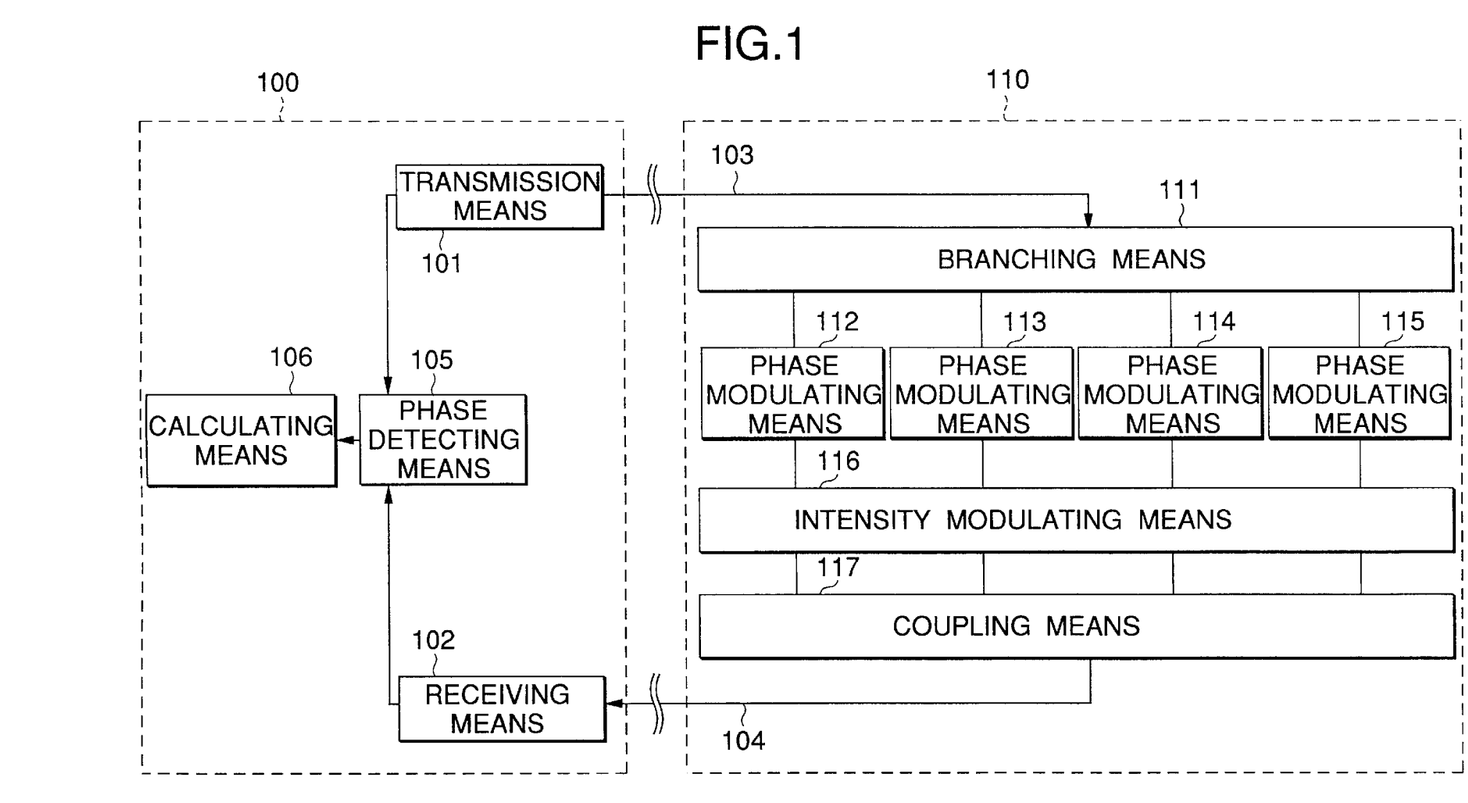
FIG. 1 is a diagram showing an arrangement of an optical encoder according to a first embodiment of the present invention.

The first embodiment of the present invention will be described with reference to the accompanying drawing. FIG. 1 is a diagram showing an arrangement of the optical encoder according to the first embodiment of the present invention. In the figure, a reference numeral 101 depicts a transmission means, 102 depicts a receiving means, 103 and 104 respectively depict an outward transmission optical fiber and a homeward transmission optical fiber, and 111 depicts a branching means for branching the light wave from the transmission optical fiber into two or more optical paths. In this embodiment, the light wave is branched into four optical paths. Reference numerals 112–115 depict phase modulating means respectively having different phase modulation amounts of D1, D2, D3 and D4 with respect to the associated branched optical paths, 116 an intensity modulating means moving together with a subject to be detected, 117 a coupling means for coupling the light waves from the branched optical paths to the homeward transmission optical fiber, 105 a phase detecting means, 106 a calculating means, 110 a detecting unit of the encoder, and 100 a control it unit.

Then, the operation of the optical encoder according to this embodiment will be explained. The transmission means 101 sends a carrier light wave shown by the following expression 1, which was subjected to the intensity modulation with a particular frequency f and a modulation degree $m_1$, to the outward transmission optical fiber 103 thereby to transmit to the detecting unit 110 which is disposed away from the control unit 100. The light wave from the outward transmission optical fiber is equally branched into the four optical paths by the branching means 111, and the branched light waves are subjected to the phase modulation when passed through the phase modulating means 112–115 as represented by the following expressions 2 to 5, respectively.

$$Pin0=4P0\{1+m_1 \sin(2\pi ft)\} \quad (1)$$

$$Pin1=P0\{1+m_1 \sin(2\pi ft+D1)\} \quad (2)$$

$$Pin2=P0\{1+m_1 \sin(2\pi ft+D2)\} \quad (3)$$

$$Pin3=P0\{1+m_1 \sin(2\pi ft+D3)\} \quad (4)$$

$$Pin4=P0\{1+m_1 \sin(2\pi ft+D4)\} \quad (5)$$

In fact, there is a delay due to the transmission optical fibers 103, 104 in addition to the delays due to these phase modulations. However, such delays can be neglected since they are a fixed phase item common to all the expressions 2 to 5. The intensity modulating means 116 performs the intensity modulation with respect to the light waves from the respective branched light paths with modulation degrees which differ in phase $\pi/2$ by $\pi/2$ sequentially from one another as to a position or a rotation angle θ of the subject as represented by the following expressions 6 to 9.

$$e1=1+m_2 \cos \theta \quad (6)$$

$$e2=1+m_2 \cos(\theta+\pi/2)=1-m_2 \sin \theta \quad (7)$$

$$e3=1+m_2 \cos(\theta+\pi)=1-m_2 \cos \theta \quad (8)$$

$$e4=1+m_2 \cos(\theta+3\pi/2)=1+m_2 \sin \theta \quad (9)$$

Accordingly, the respective light waves passed through the intensity modulating means 116 can be represented by the following expressions 10 to 13.

$$Pout1=P0\{1+m_1 \sin(2\pi ft+D1)\}(1+m_2 \cos \theta) \quad (10)$$

$$Pout2=P0\{1+m_1 \sin(2\pi ft+D2)\}(1-m_2 \sin \theta) \quad (11)$$

$$Pout3=P0\{1+m_1 \sin(2\pi ft+D3)\}(1-m_2 \cos \theta) \quad (12)$$

$$Pout4=P0\{1+m_1 \sin(2\pi ft+D4)\}(1+m_2 \sin \theta) \quad (13)$$

When the phase modulation amounts D1–D4 are set to be different in phase $\pi/2$ by $\pi/2$ sequentially from one another, for example, D1, D2, D3 and D4 are 0, $\pi/2$ and $\pi$, $3\pi/2$, respectively, the aforesaid expressions 10 to 13 can be modified respectively as follows.

$$Pout1=P0\{1+m_1 \sin(2\pi ft)\}(1+m_2 \cos \theta) \quad (14)$$

$$Pout2=P0\{1+m_1 \sin(2\pi ft+\pi/2)\}(1-m_2 \sin \theta)=P0(1+m_1 \cos 2\pi ft)(1-m_2 \sin \theta) \quad (15)$$

$$Pout3=P0\{1+m_2 \sin(2\pi ft+\pi)\}(1-m_2 \cos \theta)=P0(1-m_1 \sin 2\pi ft)(1-m_2 \cos \theta) \quad (16)$$

$$Pout4=P0\{1+m_1\sin(2\pi ft+3\pi/2)\}(1+m_2\sin\theta)=P0(1-m_1\cos 2\pi ft)(1+m_2\sin\theta) \quad (17)$$

Further, the intensity Pout of the light composed by the coupling means 117 can be represented as follows.

$$Ps1=Pout1+Pout3=P0(1+m_1\sin 2\pi ft)(1+m_2\cos\theta)+P0(1-m_1\sin 2\pi ft)(1-m_2\cos\theta)=P0(2+2m_1m_2\sin 2\pi ft\cos\theta) \quad (18)$$

$$Ps2=Pout2+Pout4=P0(1+m_1\cos 2\pi ft)(1-m_2\sin\theta)+P0(1-m_1\cos 2\pi ft)(1+m_2\sin\theta)=P0(2-2m_1m_2\cos 2\pi ft\sin\theta) \quad (19)$$

$$Pout=Ps1+Ps2=P0(4+2m_1m_2\sin 2\pi ft\cos\theta-2m_1m_2\cos 2\pi ft\sin\theta)=P0\{4+2m_1m_2\sin(2\pi ft-\theta)\} \quad (20)$$

Thus, a position or a rotation angle θ is transmitted as the phase item of the carrier light wave through the homeward transmission optical fiber 104 to the receiving means 102. The phase detecting means 105 detects the phase difference between the detection signal subjected to the phase modulation by the receiving means 102 and the reference wave having the same frequency and the same phase as those of the transmission wave produced by the transmission means 101 thereby to output the phase difference as a phase modulation amount θ. The phase modulation amount θ is converted into a position or an angle by the calculating means 106 and then outputted as a final output.

While, in the present embodiment, the outward transmission optical fiber 103 and the homeward transmission optical fiber 104 are provided separately, the output of the coupling means 117 may be coupled to the outward transmission optical fiber 103 by means of a half mirror or the like. In this case, it is possible to decrease the number of the transmission optical fibers to one. Further, it is possible to arrange the present embodiment in a manner that the intensity modulating means 116 reflects and returns the light waves and the branching means 111 also serves as a coupling means thereby to couple the light wave again to the outward transmission optical fiber 103. In this case, it is also possible to decrease the number of the transmission optical fibers to one. However, in the latter case, since the light waves pass the phase modulating means twice, the light waves are subjected to the phase modulation an amount of which is twice as much as the former case, so that the phase modulation amount of each of the phase modulating means 112–115 is set ½ of the aforesaid embodiment, that is, π/4.

The same function as that of the first embodiment can be realized in a case where the light transmission means 101 and the light receiving means 102 are provided in the detecting unit 110 and the transmission optical fibers 103, 104 are replaced by electric cables.

According to the first embodiment of the present invention, since a position or a rotation angle of a subject to be detected is converted into a phase of the carrier light wave and then transmitted, the detected position or rotation angle is not influenced by the fluctuation as to intensity such as the change in amplitude of the output of the light source, the change in transmission loss of the transmission optical fibers, so that it becomes possible to perform stable analog detection. Accordingly, a large amount of absolute positional information can be transmitted even by using small number of transmission optical fibers. That is, the first embodiment of the present invention can be formed by the cheap arrangement since many transmission fibers are not required unlike the conventional digital-type optical fiber type encoder.

Second Embodiment

Figure 2:
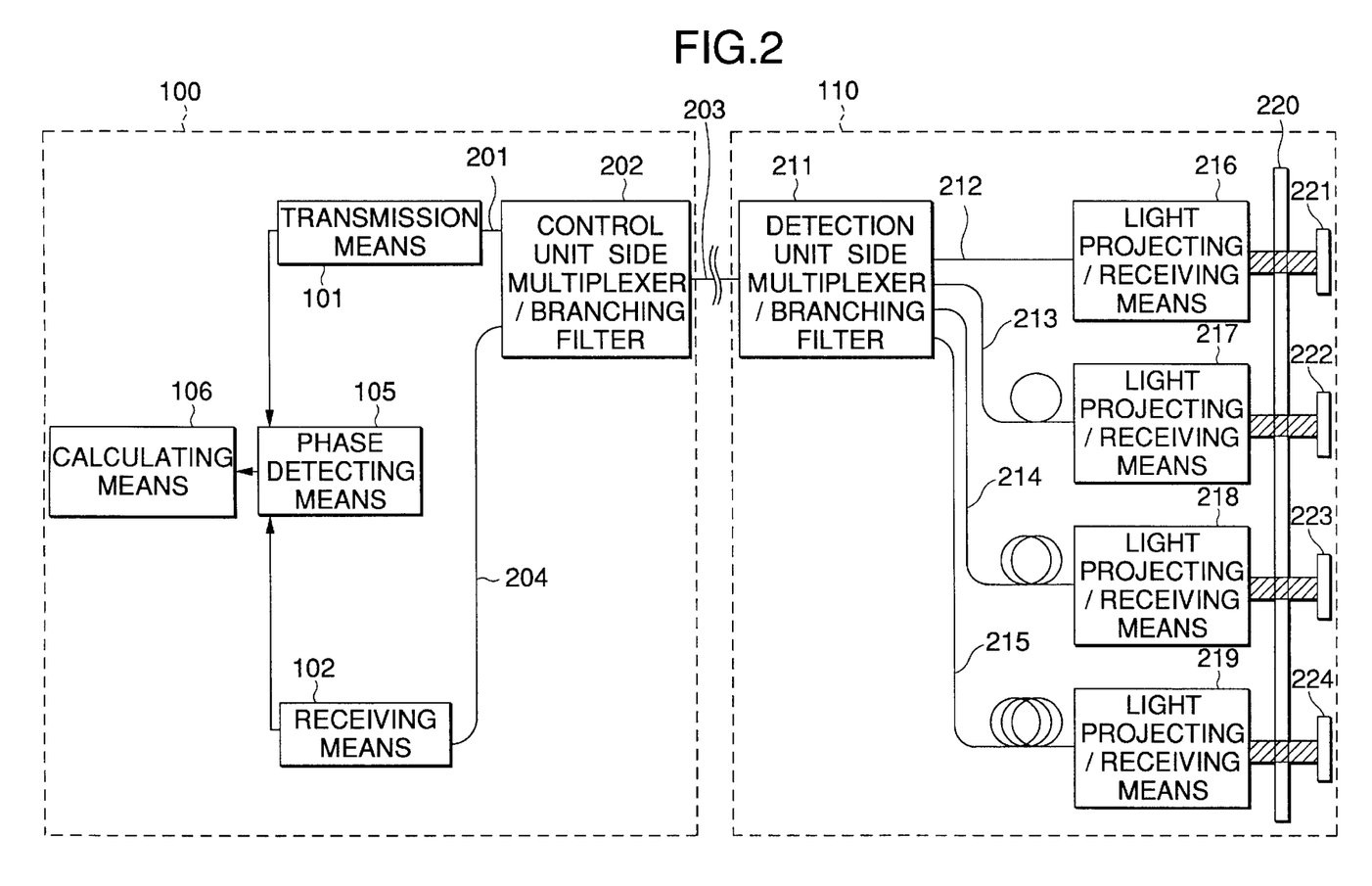
FIG. 2 is a diagram showing an arrangement of an optical encoder according to a second embodiment of the present invention.
Figure 3:
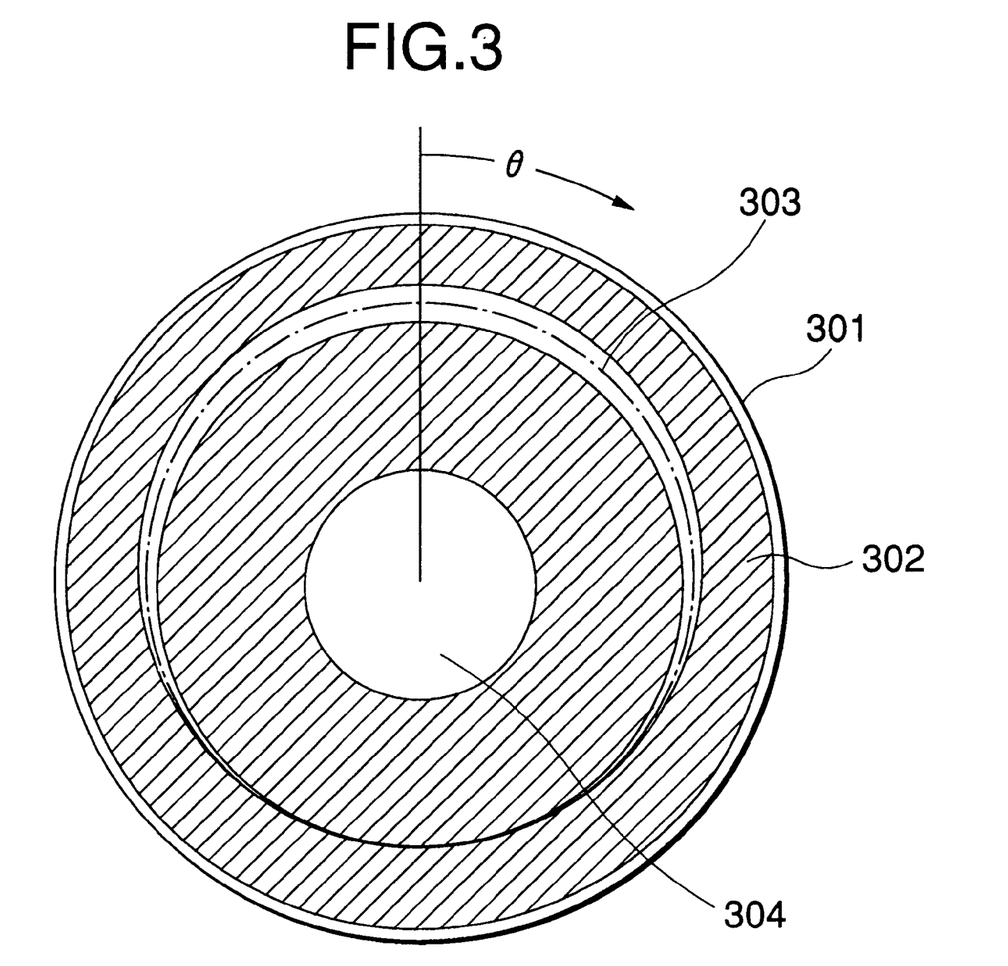
FIG. 3 is a diagram showing an example of the intensity modulating means in the second embodiment of the present invention.

The second embodiment of the present invention will be described with reference to the accompanying drawing. FIG. 2 is a diagram showing an arrangement of the optical encoder according to the second embodiment of the present invention. In the figure, a reference numeral 201 depicts a transmission side branched optical fiber, 202 a control unit side multiplexer/branching filter, 203 a transmission optical fiber, 211 a detecting unit side multiplexer/branching filter for branching the light wave from the transmission optical fiber into two or more optical paths. In this embodiment, the light wave is branched into four optical paths. Reference numerals 212–215 depict phase modulating means formed by optical fibers whose lengths are respectively set so as to sequentially delay the light waves ⅛ period by ⅛ period from one another, 216–219 light projecting/receiving means each for coupling the light wave from the optical fiber to space light, 220 an intensity modulating means, 221–224 a reflecting means for reflecting the light waves, and 204 a receiving side branched optical fiber. FIG. 3 is a diagram showing an example of the intensity modulating means. In this figure, a reference numeral 301 depicts a circular plate formed by transparent material such as glass, 302 a light shielding portion, 303 an opening portion, and 304 an attachment portion for attaching the intensity modulating means to the rotary shaft.

Then, the operation of the optical encoder according to this embodiment will be explained. The transmission means 101 sends a carrier light wave subjected to intensity modulation with a particular frequency f and a modulation degree $m_1$ like the first embodiment to the transmission side branched optical fiber 201. Then, the carrier light wave is coupled to the transmission optical fiber 203 by the control unit side multiplexer/branching filter 202 thereby to transmit the light wave to the detecting unit 110 of the encoder. In the detecting unit 110, the light wave thus transmitted is branched into four light waves by the detecting unit side multiplexer/branching filter 211, and the four branched light waves are coupled to the phase modulating means 212–215 formed by the optical fibers with different lengths, respectively. As is well known, since the light wave has an inherent propagation speed, the light wave passed through the optical fiber is delayed by a time corresponding to the length of the optical fiber. For example, supposing that the light speed in the vacuum is C, the effective refractive index of the optical fiber is n and the length of the optical fiber is L, the time delay of the light wave passed through the optical fiber will be L/nC. Thus, since a desired time delay can be obtained arbitrarily by setting a value of L, the phase modulating means can be used as a phase modulating means for an intensity modulated carrier light wave.

In this embodiment, the delay times of the phase modulating means 212–215 are set to be increased by an amount corresponding to ⅛ period as to the frequency f of the carrier light wave sequentially from the phase modulating means 212 towards the phase modulating means 215. Then, the light waves passed through the phase modulating means 212–215 are converted into space lights by the light projecting/receiving means 216–219, then passed through the intensity modulating means 220 and reflected by the reflecting means 221–224, respectively. The reflected light waves again pass the intensity modulating means 220 and arrive at the light projecting/receiving means 216–219. The light projecting/receiving means 216–219 and the reflecting means 221–224 are arranged in a manner that the light waves twice irradiated in the light projecting/receiving means are again coupled to the optical fibers 212–215 and transmitted. Such an arrangement is possible, for example, in a case where each of the light waves irradiated from the light projecting/receiving means 216–219 is made to be a parallel light flux, or in a case where it is made to be a converged light flux focusing on the reflecting means. The light waves returned to the detecting unit side multiplexer/branching filter 211 through the respective branched optical paths are phase-shifted ¼ period (π/2) by ¼ period sequentially since the light waves pass twice the optical fibers 212–215 which sequentially delay the light waves ⅛ period by ⅛ period. The intensity modulating means 220 performs, like the first embodiment, the intensity modulation with respect to the light waves from the respective branched light paths with modulation degrees which differ in phase π/2 by π/2 sequentially as to a position or a rotation angle θ of the subject as represented by the following expressions 6 to 9.

$$e1 = 1 + m_2 \cos\theta \qquad (6)$$

$$e2 = 1 + m_2 \cos(\theta + \pi/2) = 1 - m_2 \sin\theta \qquad (7)$$

$$e3 = 1 + m_2 \cos(\theta + \pi) = 1 - m_2 \cos\theta \qquad (8)$$

$$e4 = 1 + m_2 \cos(\theta + 3\pi/2) = 1 + m_2 \sin\theta \qquad (9)$$

FIG. 3 shows an example of the intensity modulating means according to the second embodiment of the present invention, in which case, the present invention is applied to a rotary encoder for measuring rotation angle of the shaft of the rotating machine. The intensity modulating means may be formed by a transparent circular plate attached to the rotary shaft. The circular plate is formed by the light shielding member 302 on which a thin film formed by metal such as Cr is provided through the patterning process, for example. The intensity modulation can be performed by forming at the light shielding member the opening portion 303 in such a manner to that the area of the light transmitting portion thereof changes sinusoidally in accordance with the rotation angle θ. When the position of light incident on the opening portion of the circular plate is changed, the modulation phase-shifted as to the rotation angle θ can be obtained. Further, if the light incident position is provided at every ¼ revolution of the circular plate, each of the branched light waves can be subjected to the intensity modulation same as those shown by the expressions 6 to 9. The intensity modulating means is not limited to one having the arrangement shown in FIG. 3 but may have any arrangement so long as the intensity of the branched light waves are changed sinusoidally in accordance with the rotation angle θ. For example, various types of the intensity modulating means may be thought of such as one in which the opening portion is formed by a plurality of openings, another one in which the circular plate is formed by a translucent film whose transmission rate changes in accordance with a position or a rotation angle θ, still another one in which a diffraction grating is formed on the circular plate through the patterning process. Further, it is possible to arrange the intensity modulating means 220 also to serve as the reflecting means 221–224 and to form the opening portion as a high-reflectivity portion. In this case, the angle of the reflection light changes in accordance with the change of the angle of the reflection portion according to the movement of the intensity modulating means, so that the efficiency of the light waves incident into the optical fibers from the light projecting/receiving means 216–219 may change. Accordingly, it is necessary to notify as to the relative relation between the intensity modulating means and the light projecting/receiving means, and the allowability of the incident efficiency of the light projecting/receiving means as to the change of the incident angle. The light waves twice incident into the light projecting/receiving means 216–219 pass the phase modulating means 212–215 and so are subjected to twice the time delay in total. As a consequence, the light waves from the phase modulating means are applied as the modulation waves represented by the expressions 14 to 17 to the detecting unit side multiplexer/branching filter 211, which in turn multiplexes these modulation waves and transmits to the control unit 100 through the single transmission optical fiber 203. The control unit side multiplexer/branching filter 202 branches the light wave transmitted through the optical fiber into the receiving side branched optical fiber 204 and the intensity of the light wave branched into the optical fiber is detected by the receiving means 102. The modulation wave detected by the receiving means 102 is same as that represented by the expression 20, and a position or a rotation angle θ is detected like the first embodiment.

According to the second embodiment of the present invention, since the phase modulating means is realized by using the delay property of the optical fiber, even if the delay optical path of several meters or several ten meters is required due to the low frequency of the carrier light wave, the optical encoder can be easily miniaturized by employing the optical fiber in the form of a winding as the phase modulating means. Further, since both the approach and homewards for the light wave is realized by employing a single transmission optical fiber in a manner that the light wave modulated by the intensity modulating means is again returned to the same optical fiber, the transmission paths can be formed in a simple configuration and so cheap and highly stable optical encoder can be realized.

Third Embodiment

Figure 4:
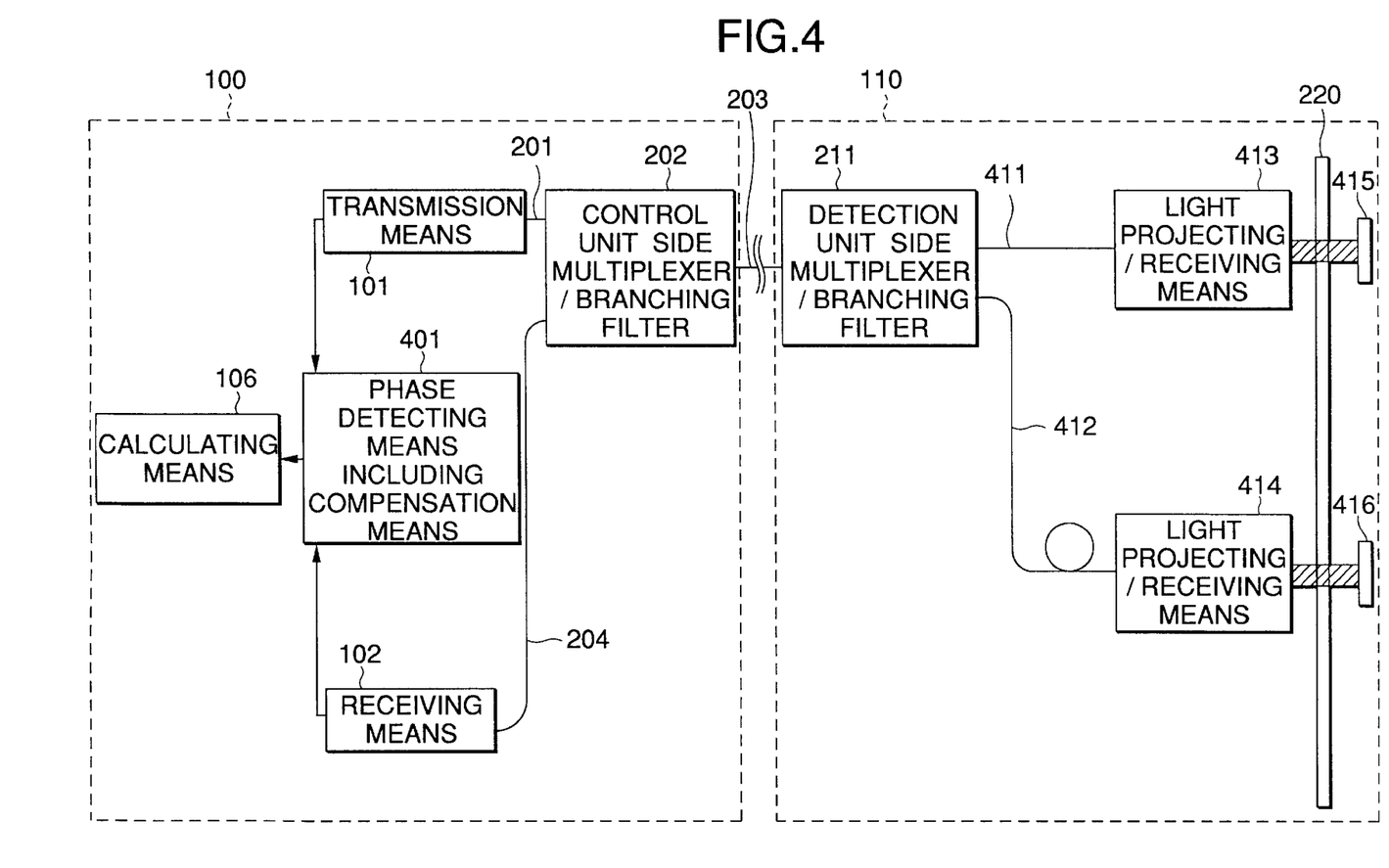
FIG. 4 is a diagram showing an arrangement of an optical encoder according to a third embodiment of the present invention.
Figure 5:
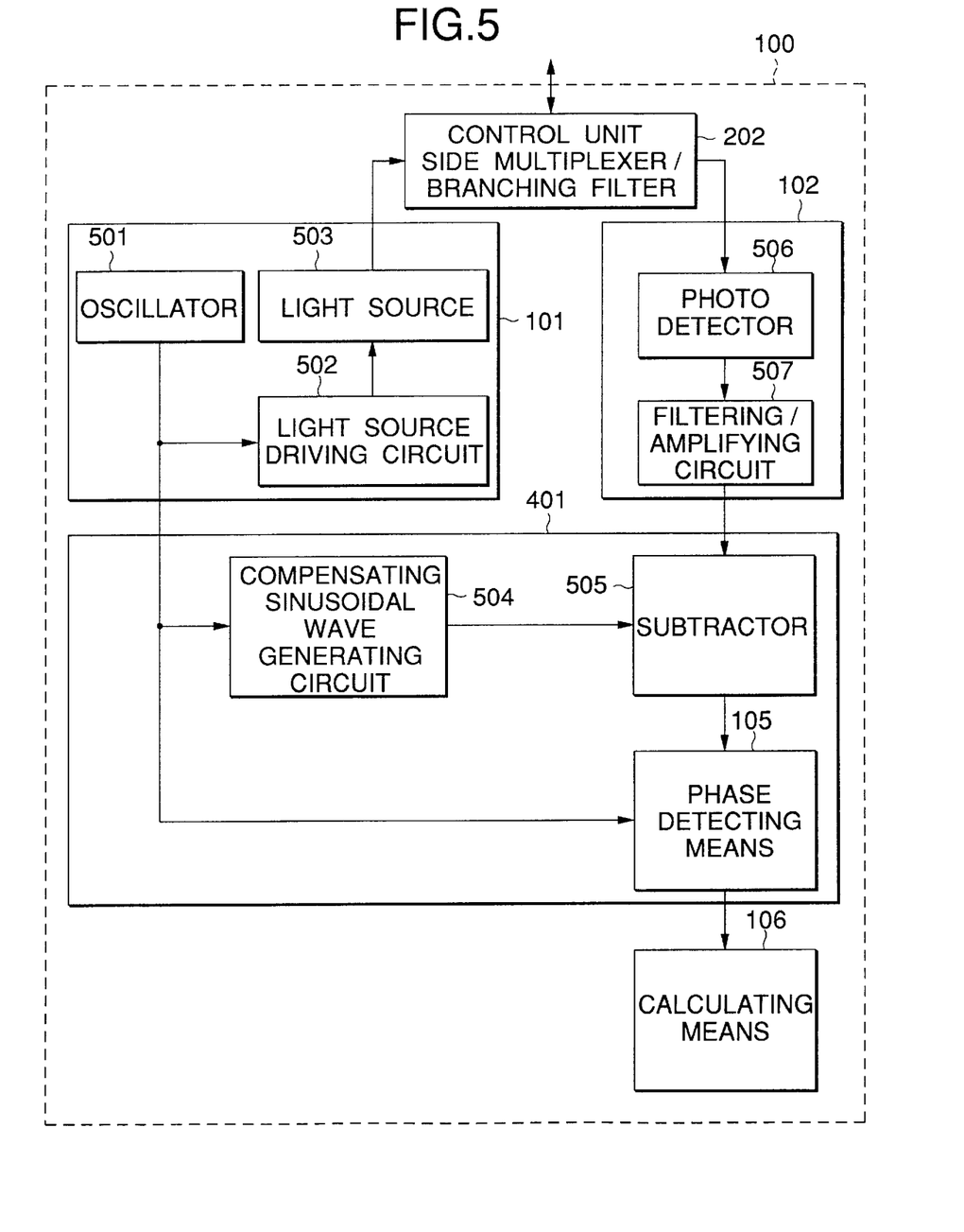
FIG. 5 is a block diagram showing an arrangement of the control unit in the third embodiment of the present invention.

The third embodiment of the present invention will be described with reference to the accompanying drawing. FIG. 4 is a diagram showing an arrangement of the optical encoder according to the third embodiment of the present invention. In the figure, reference numerals 411 and 412 depict phase modulating means which are formed by optical fibers whose lengths are set in a manner that the phase modulating means 412 delays the carrier light wave by ⅛ period as compared with the phase modulating means 411. Reference numerals 413 and 414 depict light projecting/receiving means each for coupling the light wave from the optical fiber to space light, 415 and 416 reflecting means for reflecting the light waves, and 401 a phase detecting means including a compensation means. FIG. 5 is a diagram showing an example of the internal arrangement of the control unit 100. A reference numeral 501 depicts an oscillator such as a synthesizer, 502 a light source driving circuit, 503 a light source, 504 a compensating sinusoidal wave generating circuit, 505 a subtractor, 506 a photo detector, and 507 a filtering/amplifying circuit.

Then, the operation of the optical encoder according to this embodiment will be explained. The transmission means 101 sends a carrier light wave subjected to intensity modulation with a frequency f and a modulation degree ml like the first and second embodiments to the transmission side branched optical fiber 201. Then, the carrier light wave is coupled to the transmission optical fiber 203 by the control unit side multiplexer/branching filter 202 thereby to transmit the light wave to the detecting unit 110 of the encoder. In the detecting unit 110, the transmitted light wave is branched into two light waves by the detecting unit side multiplexer/branching filter 211, and the two branched light waves are coupled to the phase modulating means 411 and 412 formed by the optical fibers with different lengths, respectively. The lengths of the optical fibers are set in a manner that the delay time of the phase modulating means 412 is larger than that of the phase modulating means 411 by a value corresponds to ⅛ period of the frequency f of the carrier light wave. The light waves passed through the phase modulating means 411 and 412 are converted into space light by the light projecting/receiving means 413 and 414, then passed through the intensity modulating means 220 and then reflected by the reflective means 415 and 416, respectively. The reflected light waves again pass the intensity modulating means 220 and arrive at the light projecting/receiving means 413 and 414. The light projecting/receiving means 413, 414 and the reflective means 415, 416 are arranged in a manner that the light waves incident twice in the light projecting/receiving means are again coupled to the optical fibers and then transmitted. The intensity modulating means 220 performs the intensity modulation in a manner that the lights of the respective branched optical paths are subjected to the intensity modulation with modulation degrees which differ to each other in phase by $\pi/2$ with respect to a position or a rotation angle $\theta$ of a subject as shown in the following expressions 6 and 7, respectively.

$$e1 = 1 + m_2 \cos \theta \quad (6)$$

$$e2 = 1 + m_2 \cos(\theta + \pi/2) = 1 - m_2 \sin \theta \quad (7)$$

Then, the lights twice incident into the light projecting/receiving means 413 and 414 again pass the phase modulating means 411 and 412 and so are subjected to twice the time delay in total, respectively. As a consequence, the light waves from the phase modulating means are applied as the modulation waves represented by the expressions 14 and 15 to the detecting unit side multiplexer/branching filter 211, which in turn multiplexes these modulation waves as a single light wave and transmits to the control unit 100 through the single transmission optical fiber 203. The control unit side multiplexer/branching filter 202 branches the light wave transmitted through the optical fiber into the receiving side branched optical fiber 204 and the intensity of the light wave branched into the optical fiber is detected by the receiving means 102. The modulation wave detected by the receiving means 102 is represented by the following expression 21.

$$Pout = Pout1 + Pout2 = P0(1 + m_1 \sin 2\pi ft)(1 + m_2 \cos \theta) +$$

$$P0(1 + m_1 \cos 2\pi ft)(1 - m_2 \sin \theta) =$$

$$P0\{2 + m_1 m_2 \sin(2\pi ft - \theta) +$$

$$SQR(2) m_1 \sin(2\pi ft + \pi/4) - m_2(\sin \theta - \cos \theta) \quad (21)$$

That is, in addition to the item of the phase modulation wave in the second item, there further appear in the expression the item of the carrier frequency of the fixed phase in the third item and the item due to a position or a rotation angle $\theta$ of the intensity modulating means 220 in the fourth item. However, since it is possible to set the frequency of the carrier light wave sufficiently high relative to the changing speed of the intensity modulating means 220, in such a case, the fourth item can be eliminated when the receiving means 102 is provided with the high-frequency band filtering characteristics. The third item can not be eliminated through the filtering since the frequency thereof is same as that of the carrier light wave. However, since it is the wave of the fixed phase to which no modulation due to a position or a rotation angle $\theta$ of the intensity modulating means 220 influences, the third item can be eliminated by preparing the wave having the same amplitude and the same phase and subtracting it from the third item. The amplitude is represented as the value $SQR(2)P0m_1$ by the transmission means 101 in the expression 21. In fact, the amplitude is a value peculiar to the device since there is a loss of the transmission optical fiber, the excessive loss of the multiplexer/branching filter or the like. The phase is a fixed value since the phase changes by the transmission optical fiber, but it takes a value peculiar to the device and so it is necessary to set in correspondence to the respective devices.

The circuit for performing the aforesaid process can be realized by the arrangement shown in FIG. 5, for example. In the transmission means 101, the light source driving circuit 502 drives the light source 503 in the manner shown in the expression 1 by the reference wave of the frequency f from the oscillator 501. The reference wave is outputted to the compensating sinusoidal wave generating circuit 504 and the phase detecting means 105. The compensating sinusoidal wave generating circuit 504 generates, based on the reference wave, the wave having a phase and an amplitude same as those of the aforesaid fixed phase item and outputs the wave to the subtractor 505. In the receiving means 102, the photo detector 506 converts the modulated light wave returned from the detecting unit 110 into an electric signal, and the filtering/amplifying circuit 507 selectively passes the high-frequency band component of the electric signal, that is, removes the fourth item of the expression 21 from the electric signal and outputs. The subtractor 505 subtracts the compensating sinusoidal signal from the output signal from the filtering/amplifying circuit thereby to output a signal formed only by the phase modulation signal. The output from the subtractor is output as a signal representing a phase modulation amount $\theta$ by the phase detecting means 105 and then output as a signal representing an angle or a position by the calculating means 106.

According to the third embodiment of the present invention, since the branched optical paths within the detecting unit of the encoder can be formed by only two optical paths, the arrangement of the detecting unit can be simplified and made cheep. Further, since both the outward and homeward transmission is realized by employing a single transmission optical fiber in a manner that the light wave modulated by the intensity modulating means is again returned to the same optical fiber, the transmission paths can be formed in a simple configuration and so cheap and highly stable optical encoder can be realized.

Fourth Embodiment

Figure 6:
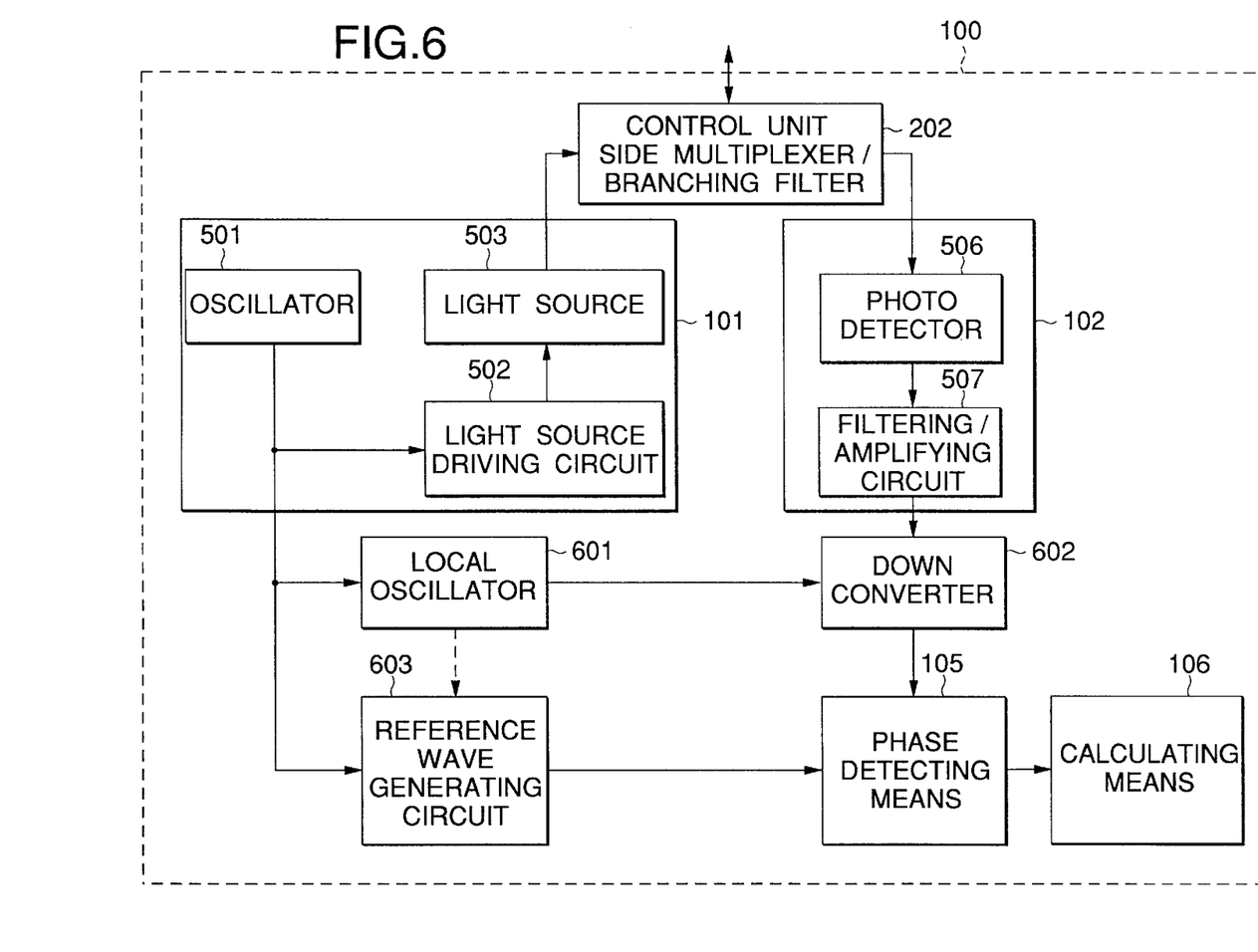
FIG. 6 is a diagram showing an example of a circuit arrangement for applying to the arrangement of the second embodiment of the present invention.
Figure 7:
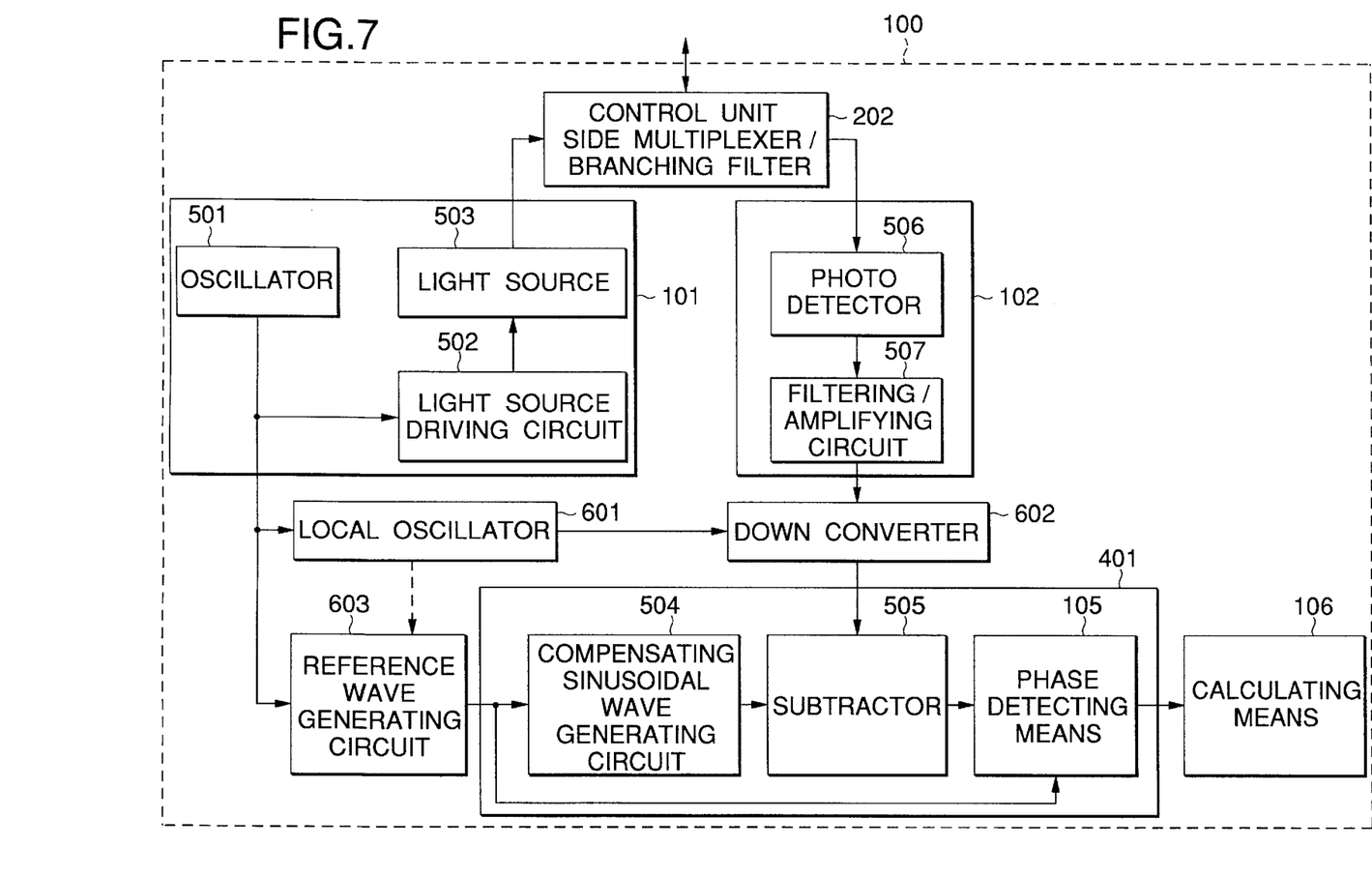
FIG. 7 is a diagram showing an example of a circuit arrangement for applying the arrangement of the third embodiment of the present invention.

The fourth embodiment of the present invention will be described with reference to the accompanying drawing. FIG. 6 is a diagram showing an example of a circuit arrangement for applying the fourth embodiment to the second arrangement of the present invention. In this figure, a reference numeral 601 depicts a local oscillator, 602 a down converter, and 603 a reference wave generator using a down converter like the element 602. FIG. 7 is a diagram showing an example of a circuit arrangement for applying the fourth embodiment to the third arrangement of the present invention.

Then, the operation of the optical encoder according to this embodiment will be explained. In FIG. 6, like the aforesaid embodiments, the oscillator 501 generates the reference wave with a frequency f and then applies it to the local oscillator 601 and the reference wave generator 603. The local oscillator 601 generates a sinusoidal wave having a frequency different from the reference frequency f by a small amount of $\delta$ and outputs to the down converter 602. The down converter 602 synthesizes the output signal of the frequency f from the receiving means 102 and the signal from the local oscillator 601 thereby to filter and pick up a signal with a frequency δ representing the frequency difference therebetween, thereby forming a so called heterodyne detecting circuit. The reference wave generator 603 generates a fixed phase wave of a frequency δ and outputs to the phase detecting means 105. The output signal from the down converter 602 is converted in its frequency into δ but maintained in its phase. Accordingly, an amount of the phase modulation θ in the detecting unit 110 of the encoder can be detected by performing the phase comparison in the phase detecting means 105 between the fixed phase wave from the reference wave generator 603 and the output signal form the down converter 602.

In the case of performing the heterodyne detection in the arrangement of the third embodiment, it is required to eliminate an excessive fixed phase wave and an excessive wave according to a position or a rotation angle θ from the intensity modulating means. In FIG. 7, the modulated light wave returned from the detecting unit 110 is converted into an electric signal by the photo detector 506, and an excessive wave thereof according to a position or a rotation angle θ is high-frequency band passed by the filtering/amplifying circuit 507 and then outputted to the down converter 602. The reference wave generator 603 generates the fixed phase wave of a frequency δ and outputs to the compensating sinusoidal wave generating circuit 504 and the phase detecting circuit 105. The compensating sinusoidal wave generating circuit 504 generates a wave whose phase and amplitude are same as those of the aforesaid excessive fixed phase wave on the basis of the fixed phase wave of the frequency δ from the reference wave generator 603 and outputs the wave to the subtractor 505. The output signal which has been frequency-converted by the down converter 602 so as to have the frequency δ is subtracted by the compensation sinusoidal signal in the subtractor 505 and outputted as a signal having only the phase modulated wave. Then, the output from the subtractor is output as a signal representing a phase modulation amount θ by the phase detecting means 105 and then output as a signal representing an angle or a position by the calculating means 106.

According to the fourth embodiment of the present invention, the frequency of the detected light wave can be converted into an arbitrary low frequency by the heterodyne detecting circuit. As a consequence, the time shaft can be extended and so the influence of error due to the change in the transmission delay time can be decreased. Further, the resolution of the phase detection can be improved without being limited by the clock frequency of the phase detecting means, so that it is possible to improve the resolution of a position or a rotation angle of a subject to be detected.

As described above, according to the optical encoder in the first to fourth arrangements of the present invention, since a position or a rotation angle of a subject to be detected is converted into a phase of the carrier light wave and then transmitted, the detected position or angle is not influenced by the fluctuation as to intensity such as the change in amplitude of the output of the light source, the change in transmission loss of the transmission optical fiber, so that it becomes possible to perform stable analog detection. Accordingly, a large amount of absolute position information can be obtained even by using small number of transmission optical fibers. That is, the first embodiment of the present invention can be formed by the cheap arrangement since many transmission fibers are not required unlike the conventional digital-type optical fiber type encoder.

According to the optical encoder in the second arrangements of the present invention, since the phase modulating means is realized by using the delay property of the optical fiber, even if the delay optical path of several meters or several ten meters is required due to the low frequency of the carrier light wave, the optical encoder can be easily miniaturized by employing the optical fiber in the form of a winding as the phase modulating means.

According to the optical encoder in the fifth arrangements of the present invention, since only two branching means are required as the branching means of an optical path in the detecting means, the arrangement of the device can be simplified.

According to the optical encoder in the sixth arrangements of the present invention, the frequency of the detected light wave can be converted into an arbitrary low frequency by the heterodyne detecting circuit. As a consequence, the time shaft can be extended and so the influence of error due to the change in the transmission delay time can be decreased. Further, the resolution of the phase detection can be improved without being limited by the clock frequency of the phase detecting means, so that it is possible to improve the resolution of a position or a rotation angle of a subject to be detected.

What is claimed is:

1. An optical encoder for detecting a position on a straight line or a rotation angle of an object to be detected, said optical encoder comprising:

a transmission means for transmitting a first intensity modulation light obtained by subjecting said object to be detected to intensity modulation by using a sinusoidal wave;

a branching means for branching said first intensity modulation light into a plurality of branched first intensity modulation lights;

a phase modulating means for modulating in phase said plurality of branched first intensity modulation lights in a manner that said plurality of branched first intensity modulation lights are shifted in phase ¼ period by ¼ period from one another;

an intensity modulating means for subjecting said plurality of branched first intensity modulation lights to intensity modulation by respective sinusoidal waves, whose phases are shifted ¼ period by ¼ period from one another and which are associated with a position on a straight line or a rotation angle of said subject to be detected, thereby to obtain a plurality of second intensity modulation lights;

a coupling means for coupling said plurality of second intensity modulation lights to a single optical transmission path; and a phase detecting means for detecting a phase difference between said combined second intensity modulation lights and said first intensity modulation lights, wherein a position on a straight line or a rotation angle of said subject is obtained from said detected phase difference, and wherein said branching means branches said first intensity modulation light into two branched first intensity modulation lights and said optical encoder further comprises a compensating means for canceling said first intensity modulation light component contained in said combined second intensity modulation lights by a compensating signal having an amplitude and a phase which are the same as those of said first intensity modulation light component.

2. An optical encoder according to claim 1, wherein said phase modulating means is formed by a plurality of optical fibers whose optical lengths are made different from one another in a manner that they are shifted from one another ¼ period by ¼ period as to said first intensity modulation lights.

3. An optical encoder according to claim 2, wherein said phase modulating means is formed by a plurality of optical fibers whose optical lengths are sequentially shifted from one another by an optical length half as large as said optical length difference, and a reflecting means for reflecting lights passed through said plurality of optical fibers and passing the reflected lights to the same optical fibers again.

4. An optical encoder according to claim 1, said optical encoder further comprises a local oscillator for oscillating with a frequency different from that of said first intensity modulation light, and frequency converters for subjecting said first intensity modulation light signal and said combined second intensity modulation light signal to frequency conversion by the oscillation signal from said local oscillator, wherein a phase difference between said signals subjected to the frequency conversion by said frequency converters is detected thereby to perform heterodyne reception.

5. An optical encoder for detecting a position on a straight line or a rotation angle of an object to be detected, said optical encoder comprising:

a transmission circuit which transmits a first intensity modulation light having a sinusoidal wave;

a branching filter which splits said first intensity modulation light into a plurality of branched-first-intensity-modulation lights;

an intensity modulating device which subjects said plurality of branched-first-intensity-modulation lights to intensity modulation thereby obtaining a plurality of second intensity modulation lights;

a multiplexer which couples said plurality of second intensity modulation lights to a single optical transmission path; and a phase detecting circuit which detects a phase difference between said combined second intensity modulation lights and said first intensity modulation light, wherein a position on a straight line or a rotation angle of said subject is obtained from said detected phase difference, and wherein said branching filter branches said first intensity modulation light into two branched first intensity modulation lights, and said optical encoder further comprises a compensating circuit which cancels said first intensity modulation light component contained in said combined second intensity modulation lights by a compensating signal having an amplitude and a phase which are the same as those of said first intensity modulation light component.

6. An optical encoder according to claim 5, further comprising:

a plurality of optical fibers connected to said branching filter to receive said plurality of branched-first-intensity-modulation lights and connected to said intensity modulating device, said optical fibers having optical lengths which are made different from one another so that one of said branched-first-intensity-modulation lights conducted through a first optical fiber is shifted by ¼ period from said first intensity modulation light, and branched-first-intensity-modulation light conducted through each successive fiber is increasingly shifted by ¼ period from branched-first-intensity-modulation light conducted through the previous fiber.

7. An optical encoder according to claim 6, wherein the intensity modulation is defined by sinusoidal waves having phases respectively offset by ¼ period from one another.

* * * * *